(12) United States Patent
Matviya et al.

(10) Patent No.: US 6,310,000 B1
(45) Date of Patent: *Oct. 30, 2001

(54) PROCESS FOR MAKING A CO-IMPREGNANT CATALYST CARBON

(76) Inventors: Thomas M. Matviya, 1000 Westpointe Dr., Apt. 225, Pittsburgh, PA (US) 15205; Richard A. Hayden, 348 Lee Ave., Pittsburgh, PA (US) 15237

( * ) Notice: Subject to any disclaimer, the term of this patent is extended or adjusted under 35 U.S.C. 154(b) by 0 days.

This patent is subject to a terminal disclaimer.

(21) Appl. No.: 08/342,817

(22) Filed: Nov. 21, 1994

(51) Int. Cl.$^7$ .................................................. B01J 20/20
(52) U.S. Cl. ........................................ 502/423; 423/445 R
(58) Field of Search .................... 423/445 R; 502/423, 502/180

(56) References Cited

U.S. PATENT DOCUMENTS

| | | | |
|---|---|---|---|
| 4,604,190 | * 8/1986 | Bearden, Jr. et al. | 208/112 |
| 4,963,513 | * 10/1990 | Marten | 423/555 |
| 5,356,849 | * 10/1994 | Matviya et al. | 502/423 |
| 5,444,031 | * 8/1995 | Hayden | 502/423 |

\* cited by examiner

*Primary Examiner*—Stuart L. Hendrickson

(57) ABSTRACT

A process is provided for the manufacture of a carbonaceous char capable of catalyzing the rapid decomposition of hydrogen peroxide in aqueous solutions. This carbonaceous char is produced from a bituminous coal or a bituminous material that has been carbonized and extensively oxidized at low (less than 700° C.) temperatures. The resultant carbonized and oxidized bituminous coal or bituminous material is then contacted with a nitrogen-containing compound in combination with at least one of sucrose or fructose as the temperature of the low-temperature char is increased to greater than 700° C. This treatment results in a high-temperature char which may then be activated as desired. These activated chars show the aforementioned ability to rapidly decompose aqueous solutions of hydrogen peroxide and are also useful for the catalytic decomposition of $H_2S$, $SO_x$, $NO_x$, chloramines, and/or peroxides in liquid and/or gaseous streams.

8 Claims, 1 Drawing Sheet

PROCESS FOR MAKING A CO-IMPREGNANT CATALYST CARBON

FIELD OF THE INVENTION

The present invention relates to a process for the manufacture, from a bituminous coal or bituminous material, of a carbonaceous char which catalyzes the rapid decomposition of hydrogen peroxide in aqueous solutions.

BACKGROUND OF THE INVENTION

Carbons which are capable of functioning as catalysts per se are well known. For example, as early as 1867 Calvert observed that the presence of charcoal enhanced a variety of oxidation reactions, including the oxidation of hydrogen sulfide, phosphine, and various organics. In those instances where carbon has been observed to affect such reactions, it has functioned as a true catalyst, i.e. it affects only the rate of a given reaction but is not itself changed by the reaction to any significant degree. It is also known that carbon chars prepared from nitrogen-rich starting materials are much more effective in catalyzing certain reactions than those prepared from nitrogen-poor feedstocks. Also, enhanced catalytic properties can be imparted to high-temperature chars prepared from nitrogen-poor starting materials by simply exposing such chars to nitrogen-containing compounds such as ammonia at high temperatures. High-temperature chars are those prepared at temperatures greater than 700° C. while low-temperature chars are prepared at temperatures less than 700° C. A number of investigators have prepared catalytically-active chars by the simple calcination or calcination-activation of low- or high-temperature chars prepared from nitrogen-rich materials such as polyacylonitrile and polyamide.

More recently, the oxidation of high-temperature chars prepared from nitrogen-poor feedstocks prior to or during exposure to nitrogen-containing compounds has been explored. Similarly, the oxidation of a low-temperature char prepared from nitrogen-rich feedstocks such as polyacrylonitrile has been evaluated.

However, all of the prior art processes for preparing carbons which are catalytically active per se have certain disadvantages which limit their overall utility and practicality. For example, some use nitrogen-rich starting materials such as polyacrylonitrile or polyamide. Such materials are expensive and have been found to generate large amounts of cyanide and other toxic gases upon carbonization. Those that use chars derived from nitrogen-poor starting materials invariably also use high-temperature chars, such as activated carbons, which require further processing. Since such materials are fairly inert chemically, the use of extensive and aggressive chemical post-treatments is usually required to effect significant changes in their catalytic capabilities. The use of high-temperature chars is, therefore, inevitably more expensive than the direct use of the raw materials from which they are derived. Additionally, such processes involve the use of large amounts of toxic and/or hazardous reagents such as nitric acid, sulfuric acid, ammonia, or toluene diisocyanate, and the generation of significant amounts of toxic and/or hazardous byproducts such as sulfur dioxide, nitric oxide, and cyanide.

Accordingly, it is the object of the present invention to provide an improved process for the manufacture of a catalytically-active carbon wherein the carbon catalyst is is prepared directly from an inexpensive and abundant nitrogen-poor starting material such as a bituminous coal or a bituminous material. It is further the object of the present invention to limit the use of agents responsible for imparting catalytic activity to the carbon by performing the essential treatments during the low temperature transition of the starting material to the final product. These treatments include oxidation of the low temperature char, preferably by inexpensive, abundant, and relatively non-toxic oxidants. The oxidized, low-temperature char is then contacted with small amounts of an inexpensive, abundant, and relatively non-toxic nitrogen-containing compound in combination with sucrose or fructose prior to and/or during the initial exposure of the oxidized char to temperatures greater than 700° C. By this method, carbon materials with high catalytic activity per se for a variety of chemical reactions can be manufactured relatively inexpensively and conveniently, with minimal departure from conventional processes for the manufacture of high-temperature carbon chars such as activated carbons and coke.

SUMMARY OF THE INVENTION

The present invention comprises a process for the manufacture of a carbon having significant catalytic properties per se wherein the carbon catalyst is prepared directly from an inexpensive and abundant nitrogen-poor feedstock such as a bituminous coal or a bituminous material such as those derived from higher or lower rank bitumens and coals and ligno-cellulose materials by various chemical treatments. Examples of higher rank coals include anthracite and semi-anthracite coals while examples of lower rank coals include peat, lignite, and subbituminous coal. Examples of the chemical treatments of these feedstocks include alkali metal treatment of the high rank materials and zinc chloride or phosphoric acid treatment of the low rank materials. These types of treatments can also be applied to ligno-cellulose materials.

In the preferred embodiment of the invention, the feedstock material is pulverized, mixed if necessary with a small amount of a suitable binder such as pitch, briquetted or otherwise formed, and sized. The sized material is then extensively oxidized with an inexpensive, abundant, and relatively non-toxic oxidant such as air at temperatures; less than 700° C., preferably less than 400° C. The oxidation is continued until additional gains in the catalytic activity of the final product are no longer desired. The oxidation is well beyond that required to remove the coking properties of typical bituminous coals, and produces a highly oxidized low-temperature carbonaceous char. Other convenient means of oxidation can also be used to effect the low-temperature oxidation and carbonization of the starting material.

The oxidized low-temperature char is then contacted with small amounts of an inexpensive, abundant, and relatively non-toxic nitrogen-containing compound such as urea in combination with sucrose or fructose prior to and/or during the initial exposure of the highly oxidized char to temperatures greater than 700° C. The amount of nitrogen-containing compound used is typically small, preferably less than 5% by weight of the oxidized low-temperature char or such that additional gains in the catalytic activity of the final product are no longer evident. The amounts of sucrose or fructose used are also typically small. Effective amounts can be as little as about one-half by weight of that amount of applied nitrogen-containing compound although higher levels may prove to be more effective. It has been found that the sucrose or fructose may be conveniently applied to the oxidized low-temperature char by means of an aqueous solution. When applied in this manner, the solution solute concentration should be adjusted such that the solution viscosity is low enough to provide for uniform distribution within the structure of the oxidized char while still providing for a relatively high loading on the oxidized char.

The initial exposure of the oxidized low-temperature char to temperatures equal to or above 700° C. is carried out while maintaining contact of the char with both the nitrogen-containing compound and the sucrose or fructose. Such thermal treatment is commonly referred to as "calcination". This calcination or heating to high temperatures, is preferably conducted under an atmosphere that is inert except for the gases and vapors attributable to the char and/or the nitrogen-containing compound and/or the sucrose and/or the fructose. The heating rate and temperatures are selected such that additional gains in the catalytic activity of the final product are no longer evident. The resultant high-temperature char may then be activated to the desired density and yield at temperatures above 700° C., preferably above 900° C., in steam and/or carbon dioxide, with or without the addition of other gasifying agents such as air. The calcined or calcined/activated char is then cooled in an oxygen-free or otherwise inert atmosphere to temperatures less than 400° C., preferably less than 100° C. If the material is inadvertently exposed to oxidants during this cooling period it may be re-heated to high temperatures and again cooled under an inert atmosphere to regain any lost catalytic activity. Additional gains in catalytic activity may be realized by repeating the oxidation, exposure to nitrogen-containing compounds, calcination or calcination/activation, and inert cooling as many times as may be desired. Alternatively, any other method known to generate catalytic activity in high-temperature chars may be applied to the resultant product to further enhance its catalytic activity.

EXAMPLES

Figure 1:
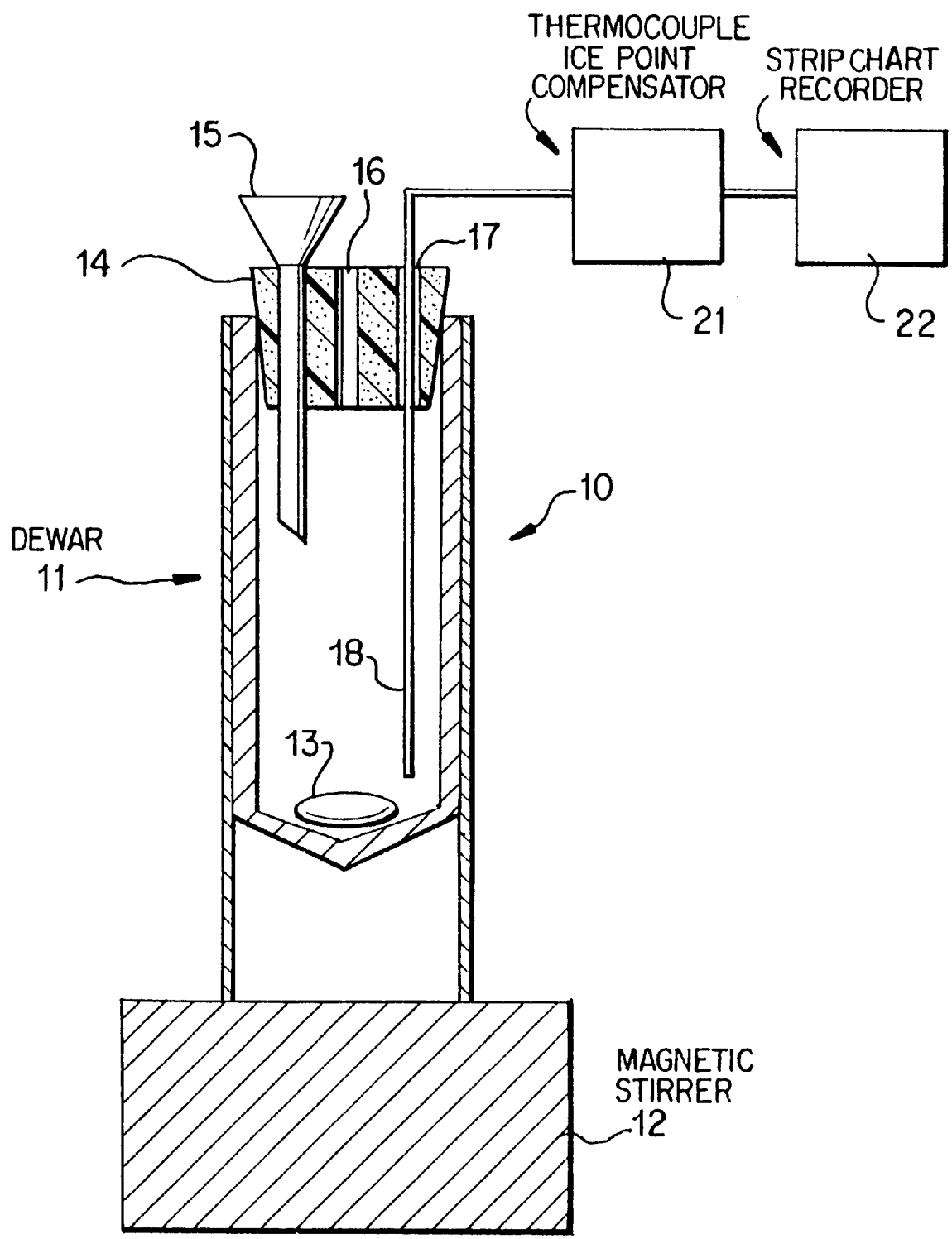
FIG. 1 is a diagrammatic view of a representative apparatus for measuring the catalytic activity of carbonaceous chars.

The following examples illustrate the practice of the invention as well as the importance of both extensive oxidation and treatment with a nitrogen-containing compound in combination with sucrose and/or fructose in the practice of the invention.

Example 1

Bituminous coal was pulverized, mixed with about 4 to 6% coal tar pitch, and briquetted. The resultant briquettes were crushed and sized to produce an approximately less than 3 mesh size and greater than 5 mesh size (U.S. Standard Series sieves) material. In the presence of air, this material was oxidized by heating from 100° C. to 250° C. at a rate of 45° C. per hour, then from 250° C. to 350° C. at a rate of 60° C. per hour, then held at 350° C. for 2.2 hours. The resultant oxidized material was cooled in a low oxygen content atmosphere and portions thereof were subsequently sized to +5 mesh and impregnated with aqueous solutions of urea, urea and sucrose, and urea and fructose. Three samples were prepared using each of the impregnating solutions. The impregnated chars were dried after impregnation. The dry impregnant loadings are given in Table 1. After impregnation, portions of the oxidized, impregnated low-temperature chars were rapidly heated to 950° C. under an inert gas atmosphere and maintained at that temperature for 20 minutes. Immediately following this calcination treatment the materials were contacted with steam, while maintaining the 950° C. temperature, for a period of time sufficient to result in gasification of the carbon to achieve an Apparent Density (A.D.) (Test Method TM-7, Calgon Carbon Corporation, Pittsburgh Pa.) of approximately 0.5 grams per cc when sized to less than 4 and greater than 6 mesh (U.S. Standard Series sieves). After gasification, the materials were cooled to near-ambient temperature in a nitrogen gas atmosphere and sized. To insure that the catalytic activities of the activated samples were not impacted by inadvertent exposure to oxidants during cooling, each of the activated samples was again heated to 950° C. under nitrogen. These samples were then maintained at 950° C. under nitrogen for approximately 20 minutes. Following this re-calcination procedure, the activated samples were cooled to near-ambient temperature in a nitrogen gas atmosphere.

The catalytic activities of the resultant samples were determined by measuring the time required for a portion of each carbonaceous char to decompose a given quantity of hydrogen peroxide. Measurement was accomplished using the apparatus 10 shown in FIG. 1. In practice, the carbon to be tested is first pulverized such that minimally 90% of the material would pass through a 325 mesh U.S. Standard Series sieve. The styrofoam cap 14 of the apparatus illustrated in FIG. 1 is then removed and a 0.250 gram portion of this pulverized material is placed in the Dewar 11 (Catalog Number 101 95A, Fisher Scientific, Pittsburgh Pa., or similar). Deionized water (100.0 mL) is then added to the Dewar. The addition of this water is performed in such a manner that any pulverized carbon clinging to the sides of the Dewar is carried into the main body of the water in the bottom of the Dewar. Next, a 50.0 mL aliquot of buffer solution is added to the Dewar. This buffer solution is 0.500 molar in $KH_2PO_4$ and 0.500 molar in $K_2HPO_4$. At this point, a magnetic stir bar 13 is placed into the Dewar and the magnetic stirrer 12 (Model PC-351, Corning Hot Plate Stirrer, Corning Scientific Products or Model 18425 Nuova ll Stir Plate, Thermolyne Corporation, Dubuque Iowa, or similar), is energized. Stirring speed is increased until a vortex minimally greater than ¼" deep is formed in the mixture. If the stir bar decouples from the magnetic field before the desired stirring rate is achieved, it is replaced with a bar having a stronger magnetic field. Optionally, the Dewar can be replaced with a similar unit that, due to manufacturing variances, positions the stir bar further into the magnetic field of the stir plate. If the stir bar still does not adequately couple with the stir plate magnetic field, the Dewar can be shortened by removing some of the bottom portion of the outside metal casing. At this point the styrofoam cap is replaced on the Dewar, the thermocouple 18 (Type K or J, ¹⁄₁₆" diameter, Inconel sheathed, ungrounded) is inserted through the styrofoam cap and into the mixture such that a measurement representative of the mixture temperature is obtained, and the thermocouple ice point compensator 21 (Model MCJ-J or MCJ-K, Omega Engineering, Inc., Stamford, Conn. or similar) and strip chart recorder 22 are energized. The strip chart recorder 22 tracing is monitored until the system is seen to come to thermal equilibrium at ambient temperature. Once thermal equilibrium is achieved, 50.0 mL of a hydrogen peroxide solution (0.41 moles $H_2O_2$ per 50.0 mL) is added to the Dewar through the funnel 15 in the styrofoam cap. Care is taken to insure that the hydrogen peroxide solution is at ambient temperature prior to the addition. As the hydrogen peroxide solution is added to the Dewar, the strip chart recorder tracing is marked to indicate the time of addition. The strip chart recorder tracing is then monitored until the tracing indicates that a constant temperature above ambient has been reached. At this point, the styrofoam cap is removed from the Dewar and the action of the stir bar is observed. If the stir bar is no longer mixing the solution in the desired manner the entire procedure is repeated. If adequate mixing is observed, the elapsed time required for the recorder tracing to reach 75% of its maximum, constant deflection is determined. This value represents the time required for the catalytic carbonaceous char to decompose three-fourths of the available hydrogen peroxide and is referred to as the t-¾ time. Therefore the lower the t-¾ time, the higher is the catalytic activity of the carbonaceous char. The t-¾ time value is reported in units of minutes. The average catalytic activity, t-¾ time, and standard deviation of the carbons prepared as described above, when determined using this method, are given in Table 1. As shown in Table 1, the t-¾ times of the carbons improved with re-calcination. This indicates that some inadvertent exposure to oxidants occurred during the cooling period that immediately followed activation. Table 1 also shows that the catalytic activities of the urea-sucrose and urea-fructose impregnated carbons are superior (i.e. lower t-¾ times) to those resulting from only urea impregnation.

Example 2

Bituminous coal was pulverized, mixed with about 4 to 6% coal tar pitch, and briquetted. The resultant briquettes were crushed and sized. In the presence of excess air, this material was oxidized by heating from approximately 200° F. to 800° F. over a period of about 5 hours. The resultant oxidized material was cooled in a low oxygen content atmosphere and subsequently sized to approximately less than 3 mesh and greater than 5 mesh (U.S. Standard Series sieves). Portions of this sized, oxidized, low-temperature char were then impregnated with aqueous solutions of urea, urea and sucrose, urea and fructose, and two levels of sucrose. Following this impregnation the chars were dried. The dry impregnant loading for each of the chars is given in Table 2. After impregnation, the oxidized, impregnated low-temperature chars were rapidly heated to 950° C. under an inert gas atmosphere and maintained at that temperature for 20 minutes. Immediately following this calcination treatment the materials were contacted with steam, while maintaining a 950° C. temperature, for a period of time sufficient to result in gasification of the carbon to an Apparent Density (A.D.)(Test Method TM-7, Calgon Carbon Corporation, Pittsburgh Pa.) of approximately 0.5 grams per cc when sized to less than 4 mesh and greater than 6 mesh (U.S. Standard Series sieves). After gasification, the materials were cooled to near-ambient temperature under an inert atmosphere and subsequently sized. To insure that the catalytic activities of the activated samples were not impacted by inadvertent exposure to oxidants during cooling, each of the activated samples was re-heated to 950° C. under a nitrogen gas atmosphere. Each sample was maintained at 950° C. under nitrogen for approximately 20 minutes. Following this re-calcination procedure, the activated samples were cooled to near-ambient temperature in a nitrogen gas atmosphere. Duplicate samples were prepared in the manner described using all the impregnating solutions except those aqueous solutions containing only sucrose.

The catalytic activities of the chars so produced were determined using the same method as described in Example 1. The results of this determination are presented in Table 2. In this Table, average values and standard deviations are presented where duplicate samples were prepared.

As shown in Table 2, the t-¾ times of all the carbons improved with re-calcination. This indicates that some exposure to oxidants occurred during the cooling period that immediately followed activation. The t-¾ times for the samples shown in Table 2, after re-calcination, clearly show that impregnation with urea or sucrose results in improved catalytic activities (i.e. t-¾ times) relative to the unimpregnated sample. However, it is also evident that the combination of urea with either sucrose or fructose results in the development of lower t-¾ times than can be achieved with urea or sucrose alone.

Example 3

Bituminous coal is pulverized, mixed with about 4 to 6% coal tar pitch and briquetted. The resultant briquettes were crushed and sized to produce an approximately less than 3 mesh size and greater than 5 mesh size (U.S. Standard Series sieves) material. In the presence of air, this material was oxidized by heating from 100° C. to 250° C. at a rate of 45° C. per hour, then from 250° C. to 350° C. at a rate of 60° C. per hour, then held at 350° C. for 2.2 hours. The resultant oxidized material was cooled in a low oxygen content atmosphere and stored for approximately six months. Portions of this oxidized material were subsequently sized to +5 mesh and impregnated with aqueous solutions of urea, sucrose, fructose, urea and sucrose, urea and fructose, urea and sucrose and fructose, and sucrose and fructose. The impregnated chars were dried after impregnation. The dry impregnant char loadings are given in Table 3. After impregnation, portions of the oxidized, impregnated low-temperature chars and a portion of the unimpregnated char were rapidly heated to 950° C. under an inert gas atmosphere and maintained at that temperature for 20 minutes. Immediately following this calcination treatment the materials were contacted with steam, while maintaining a 950° C. temperature, for a period of time sufficient to result in gasification of the carbon to an Apparent Density (A.D.) (Test Method TM-7, Calgon Carbon Company, Pittsburgh Pa.) of approximately 0.5 grams per cc when sized to less than 4 and greater than 6 mesh (U.S. Standard Series sieves). After gasification, the materials were cooled to near ambient temperature in a nitrogen gas atmosphere and sized. To insure that the catalytic activities of the activated samples were not impacted by inadvertent exposure to oxidants during cooling, each of the activated samples was re-heated to 950° C. under nitrogen. These samples were then maintained at 950° C., under nitrogen, for approximately 20 minutes. Following this re-calcination procedure, the activated samples were cooled to near-ambient temperature in a nitrogen gas atmosphere. The catalytic activity of the activated and re-calcined materials were determined using the same method as described in Example 1. When determined in this manner, the t-¾ times shown by these materials are given in Table 3.

As shown in Table 3, the t-¾ times of all the carbons improved with re-calcination. This indicates that some exposure to oxidants occurred during the cooling period that immediately followed activation. The t-¾ times for the samples shown in Table 3, after re-calcination, clearly show that impregnation with urea, sucrose, and/or fructose in any combination results in improved catalytic activities (i.e. lower t-¾ times) relative to the carbon produced without the use of any impregnant. Examination of the data contained in Table 3 also shows that the lowest t-¾ times, and therefore the highest catalytic activities, are obtained (except for sample Q which is an anomalous result) by impregnating the low-temperature oxidized char with urea in combination with sucrose and/or fructose.

What is claimed is:

1. A process for the manufacture of a carbonaceous char which comprises the steps of:
   a. carbonizing a bituminous coal or a bituminous material at temperatures below 700° C.;
   b. oxidizing said carbonized bituminous coal or bituminous material at temperatures below 700° C. during or after said carbonization,
   c. contacting the carbonized and oxidized bituminous coal or bituminous material with a nitrogen-containing compound and a at least one of sucrose or fructose and, during or after said contacting, increasing the temperature to above 700° C., to provide said carbonaceous char.

2. The process as set forth in claim 1 including step (d), activating said carbonaceous char at temperatures above 700° C. using one of $H_2O$, $CO_2$, $O_2$ or mixture thereof.

3. The process of claim 2 wherein steps (c) and (d) are carried out simultaneously.

4. The process of claim 2 wherein step (c) is carried out prior to step (d).

5. The process of claim 1 wherein the carbonaceous char is cooled to temperatures less than 400° C. under a substantially oxygen-free or inert atmosphere following step (c).

6. The process of claim 1 wherein the carbonaceous char is cooled to temperatures less than 100° C. under a substantially oxygen-free or inert atmosphere following step (c).

7. The process of claim 2 wherein the activated carbonaceous char is cooled to temperatures less than 400° C. under a substantially oxygen-free or inert atmosphere following step (d).

8. The process of claim 2 wherein the activated carbonaceous char is cooled to temperatures less than 100° C. under a substantially oxygen-free or inert atmosphere following step (d).

* * * * *